US 6,705,065 B2

(12) United States Patent
Saiia

(10) Patent No.: US 6,705,065 B2
(45) Date of Patent: *Mar. 16, 2004

(54) MOWER CUTTING UNIT HAVING AN INTERNAL MOTOR

(75) Inventor: Anthony J. Saiia, Racine, WI (US)

(73) Assignee: Textron Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/217,153

(22) Filed: Aug. 12, 2002

(65) Prior Publication Data

US 2003/0079451 A1 May 1, 2003

Related U.S. Application Data

(63) Continuation of application No. 08/987,667, filed on Dec. 9, 1997, now Pat. No. 6,430,902.

(51) Int. Cl.[7] ............................................. A01D 75/30
(52) U.S. Cl. ...................................... 56/7; 56/1
(58) Field of Search ............................ 56/6, 7, 1, 249, 56/294, 249.5, 255, 295, DIG. 17, DIG. 20

(56) References Cited

U.S. PATENT DOCUMENTS

| 1,782,636 | A | 11/1930 | Stokes |
| 2,057,417 | A | 10/1936 | Clapper |
| 3,910,016 | A | 10/1975 | Saiia et al. |
| 4,306,402 | A | 12/1981 | Whimp |
| 4,878,338 | A | 11/1989 | Aldred et al. |
| 4,887,418 | A | 12/1989 | Pelletier |
| 5,088,596 | A | 2/1992 | Agnoff |
| 5,412,932 | A | 5/1995 | Schueler |
| 5,553,445 | A | 9/1996 | Lamb et al. |

Primary Examiner—Robert E. Pezzuto
(74) Attorney, Agent, or Firm—Harness, Dickey, & Pierce, P.L.C.

(57) ABSTRACT

A greens mower having internally powered cutting units. The motor to power the cutting units is located inside the cutting unit thus eliminating the need to balance the weight of the motor outside the cutting unit and also eliminating the need for belts, chains, gears or couplers to transfer power from the motor to the cutting unit.

9 Claims, 5 Drawing Sheets

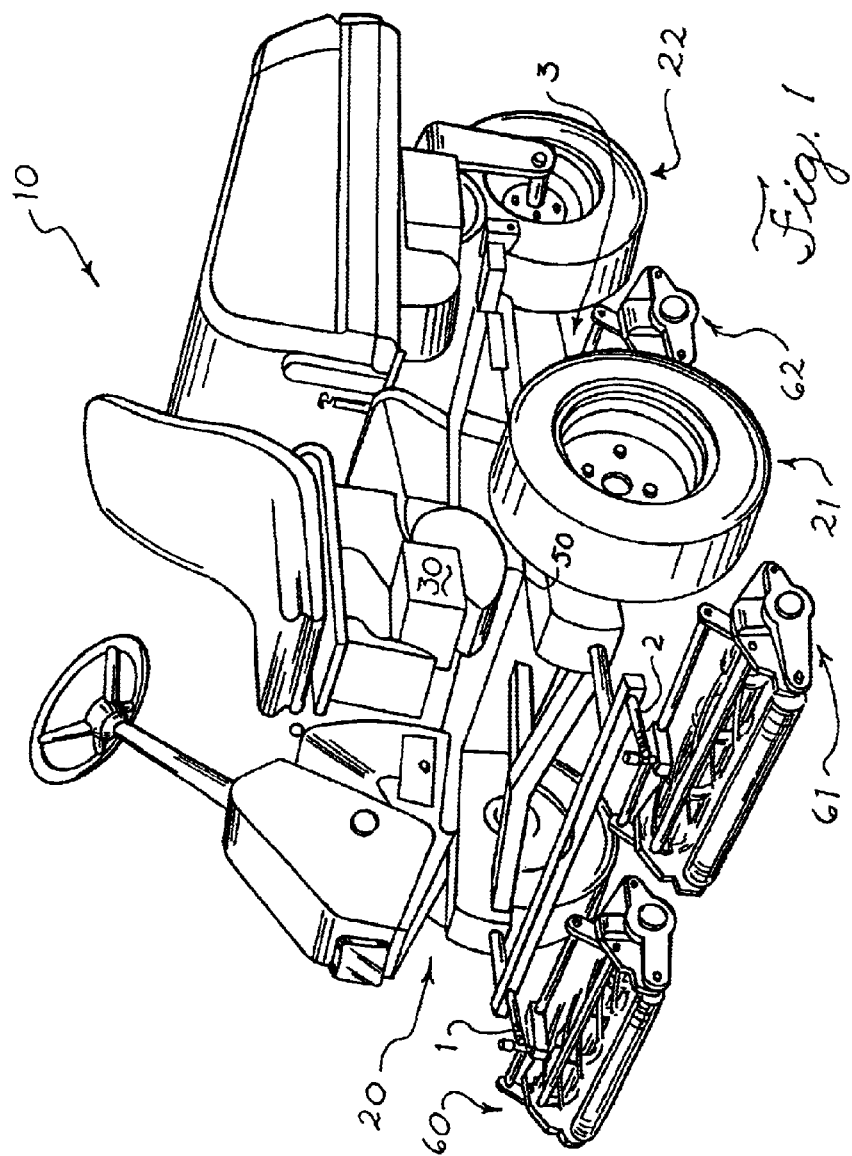

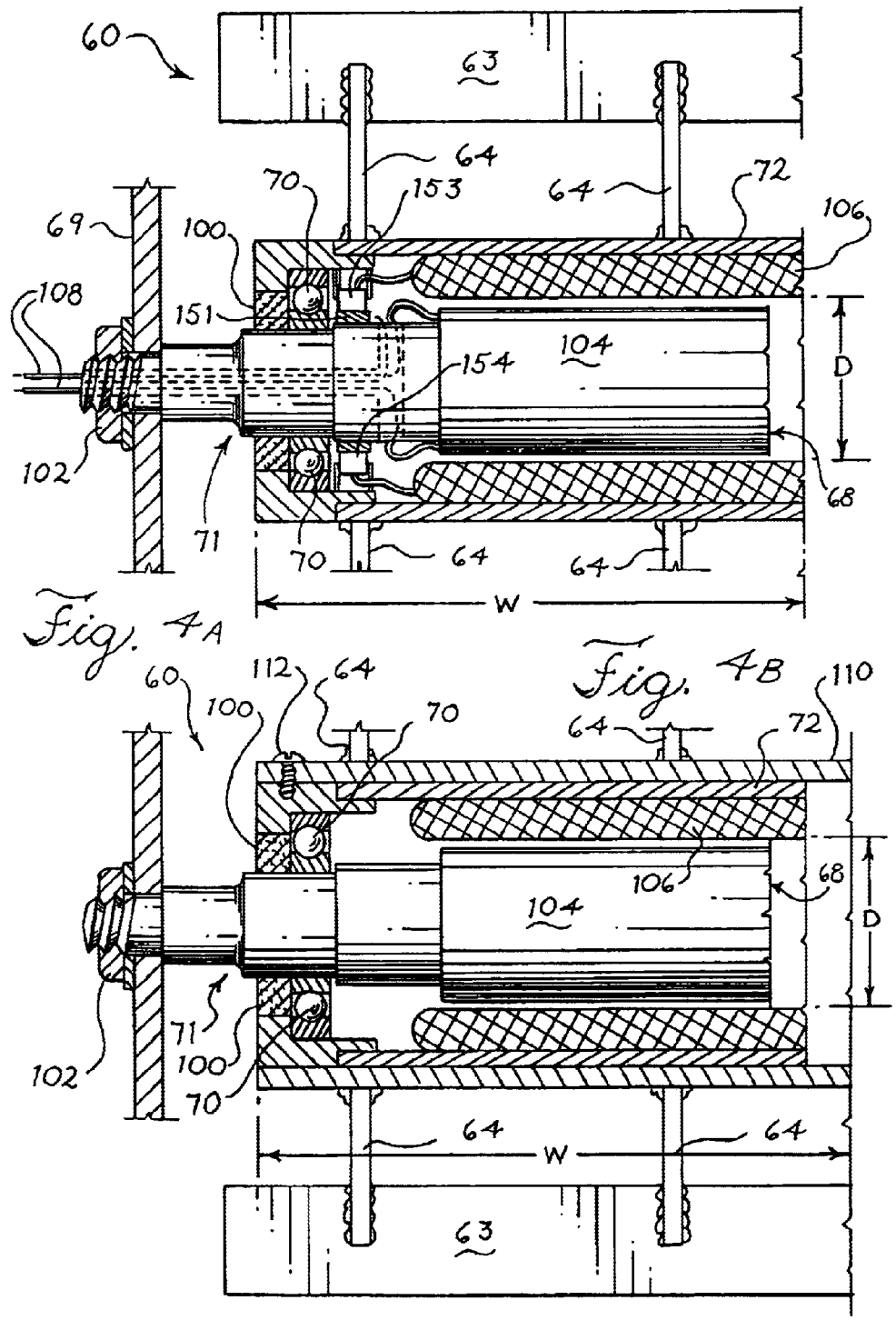

MOWER CUTTING UNIT HAVING AN INTERNAL MOTOR

This application is a continuation of U.S. Ser. No. 08/987,667, filed Dec. 9,1997, now U.S. Pat. No. 6,430,902, the disclosure of which is incorporated by reference.

BACKGROUND OF THE INVENTION

1. Field of the Invention

This invention relates in general to an improved power driven mower, and specifically to an electric motor to power a mower cutting unit wherein the electric motor is housed inside the cutting unit.

2. Prior Art

Commercial mower applications have powered the cutting units through a variety of means. Early units were ground driven through a gear train connected to a pair of ground engaging wheels. Later, cutting units were driven by an engine through chains, gears, drive shafts, or belts. Later designs incorporated hydraulic motor drives or internal combustion engines which offered flexibility in applying power to multiple mowing units attached to a prime mover chassis. In designs using hydraulic motors, the motor was attached to the frame of the cutting unit and powered the cutting unit through belts, gears or direct in-line couplers.

Recently, electric motors are being used to power mower cutting units. These motors power the cutting units through belt, gear, or in-line coupler connections. The cutting unit motor in these prior art mowers is positioned either above and to one side of the cutting unit, or simply out to the side of the cutting unit. In either case, the weight of the motor must be counterbalanced to ensure that the weight applied by the cutting unit is symmetric across the full width of the cutting unit. If the weight of the motor is not counter-balanced, the actual height and quality of the cut of the grass can be adversely affected. This problem is especially evident for a cutting unit powered by an electric motor as the motor can be heavy. In addition, the weight of the counter-balance makes the overall weight of the cutting unit greater, which again can adversely affect the cutting quality and the life of the mower. Further, because the motor resides in an exposed position outside the cutting unit housing, it can be easily damaged during the mowing process from accidental impact with objects near the surface to be mowed.

These conventional cutting unit motors utilize additional mounting frame means, bearings, couplings and various hardware components to provide power to the cutting unit. Such external drive designs take up a relatively large amount of space, require frequent servicing, and are not well suited to dirty or moist environments.

Accordingly, there is a need in the art for a mower that solves the above-identified problems. Such a mower would not have the drawbacks associated with counter-balancing the weight of the motor, externally mounting the motor, or the risk of damage to the motor due to limited ground and side clearance.

SUMMARY OF THE INVENTION

This invention relates to a mower having an improved cutting unit drive system using an electric motor, a hydraulic motor, or any other kind of motor. The novel cutting unit drive system is located within the cutting unit instead of mounted outside the cutting unit. Although the invention is described with respect to an electric motor, it will be understood by those skilled in the art, that the advantages of this invention will apply to other types of motors as well.

Based on the above-mentioned problems in the prior art, it is an object of the present invention to provide a motorized cutting unit in which the drive assembly is fully enclosed inside the cutting unit.

One object of the current invention is to distribute weight symmetrically across the width of the cutting unit, therefore eliminating the need for counter-balance weights and reducing weight of the overall cutting unit.

Another object of the current invention is to eliminate the belts, chains, gears or other couplers normally used to transfer power from a motor to the cutting unit.

A further object of the current invention is to provide cooling for the motor by using the air movement generated by the cutting unit blades, thus eliminating the need for a fan or other external cooling device and minimizing overheating concerns.

Still a further object of the current invention is to protect the motor unit from damage due to accidental impact when the mower is used to trim close to objects such as trees, bushes, etc.

Still a further object of the current invention is to provide a motor drive assembly that is easily reached for servicing, repair and replacement.

These and other advantages and features which characterize the present invention are pointed out with particularity in the following detailed description of the preferred embodiment, drawings and claims.

BRIEF DESCRIPTION OF THE DRAWINGS

The present invention is illustrated by way of example and not limitation in the figures of the accompanying drawings, in which like references indicate similar elements and in which:

FIG. 1 is a general drawing of mower;

FIG. 4A is a cross sectional view of one embodiment of the cutting unit according to the present invention; and FIG. 4B is a cross sectional view of another embodiment of the cutting unit according to the present invention;

DETAILED DESCRIPTION OF THE PREFERRED EMBODIMENTS

Figure 2A:
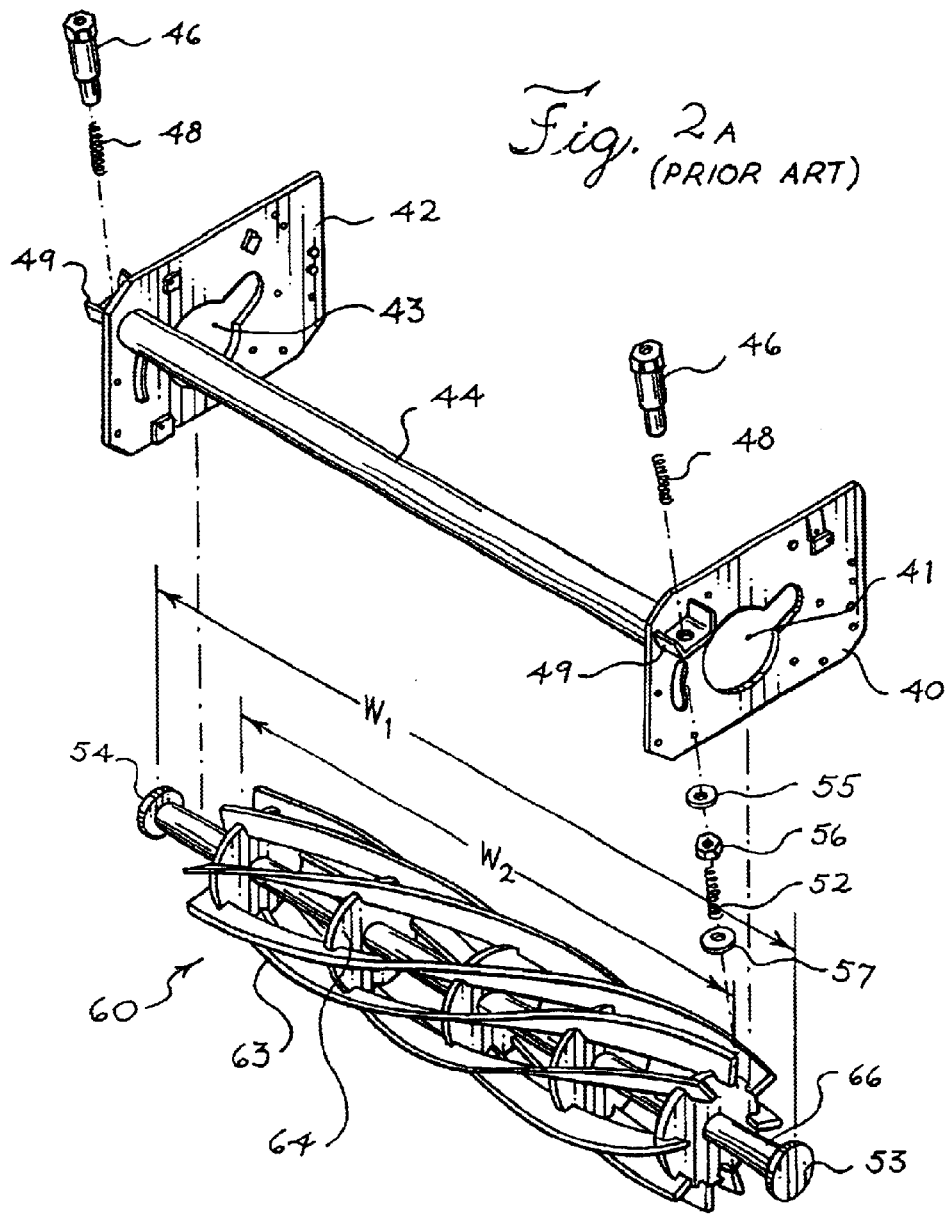
FIG. 2A is an exploded view of a reel type cutting unit of the prior art.

FIG. 1 is a general illustration of a mower 10. The current invention may be used with the mower 10 as generally described below. Although the invention is described with respect to the preferred embodiment, those skilled in the art will recognize that other versions of the cutting unit embodying the current invention are possible and that the invention is not limited to a specific embodiment.

Although many constructions are possible, in the embodiment shown in FIG. 1, the riding greens mower 10 includes three wheels 20, 21, and 22. Two front drive wheels 20 and 21 are powered by a drive motor 30. The rear wheel 22 is positioned behind and between the two front drive wheels 20 and 21 and is pivotable to steer the mower 10. The cutting units 60, 61, and 62 are ideally reel cutting units. In FIG. 1, the cutting units 60, 61, and 62 are positioned ahead of each of the wheels 20, 21, and 22 respectively. Of course other positions are possible while still remaining within the spirit and scope of the invention. The cutting units 60, 61, and 62 are optionally mounted on lift arms 1, 2, and 3. The operator selectively raises and lowers the lift arms 1, 2, and/or 3 depending on which cutting units 60, 61, and/or 62 the operator wishes to use or to service. When in the lowered or operative position, the lifts 1, 2, and 3 allow free floating articulation of the cutting units 60, 61, and 62 to follow ground contours and to aid in providing for an even cut over an undulating surface such as a golf course green. The drive motor 30 drives the mower 10, is powered by a battery (not shown), and is controlled by a controller 50.

In one embodiment, the cutting units 60, 61, and 62 are 11-blade reel-type cutting units. Cutting heights are adjustable from 5/64'ths to 9/16'ths inches. Nine, seven and five-blade cutting units are recommended for tees, approaches, fairways and sports fields and also may utilize the advantages of the present invention. Although three cutting units 60, 61, and 62 are shown in FIG. 1, it will be appreciated by those skilled in the art that each of the cutting units 60, 61, and 62 operate similarly, hence only one cutting unit (for example cutting unit 60) will be discussed in detail.

FIG. 2A shows an exploded view of a typical mower cutting unit 60 of the prior art. The cutting unit 60 has a central shaft 66 that extends the width $W_1$ of the cutting unit 60. Disk shaped supports or spyders 64 are regularly spaced along the central shaft 66 and are secured to the central shaft 66 in a coaxial relationship. The spyders 64 support the blades 63 that extend the width $W_2$ of the cutting unit 60, but in a helical or spiral manner. The cutting unit 60 includes supporting side plates 40 and 42. A cross bar 44 extends between the two side plates 40 and 42 and provides support for the overall cutting unit 60. Each side plate 40 and 42 includes apertures 41 and 43 which receive a bearing housing (not shown) that supports the ends of the central shaft 66. The side plates 40 and 42 also provide mounting locations for the belt driven motors (see FIG. 2B) and for the motors direct drive (see FIG. 2C) of the prior art.

Figure 2B:
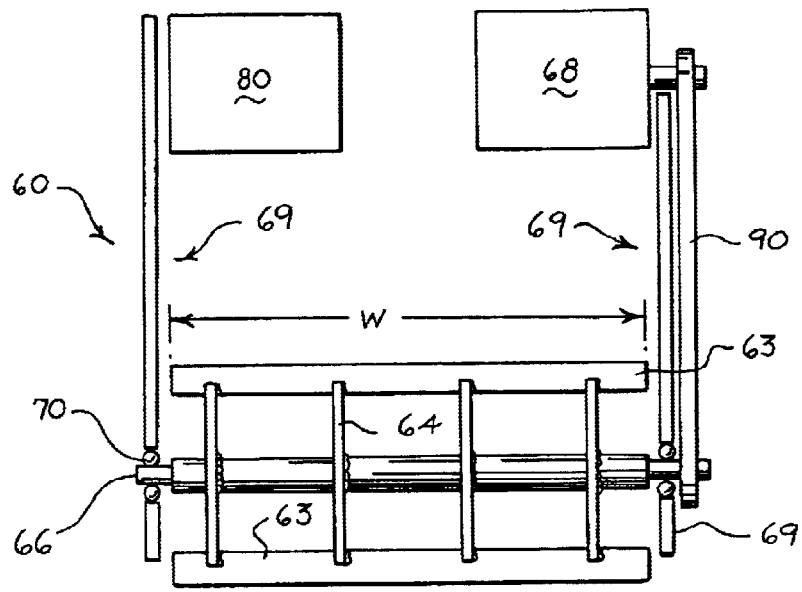
FIG. 2B is a stylized drawing showing a first embodiment of the motor placement in a prior art cutting unit.
Figure 2C:
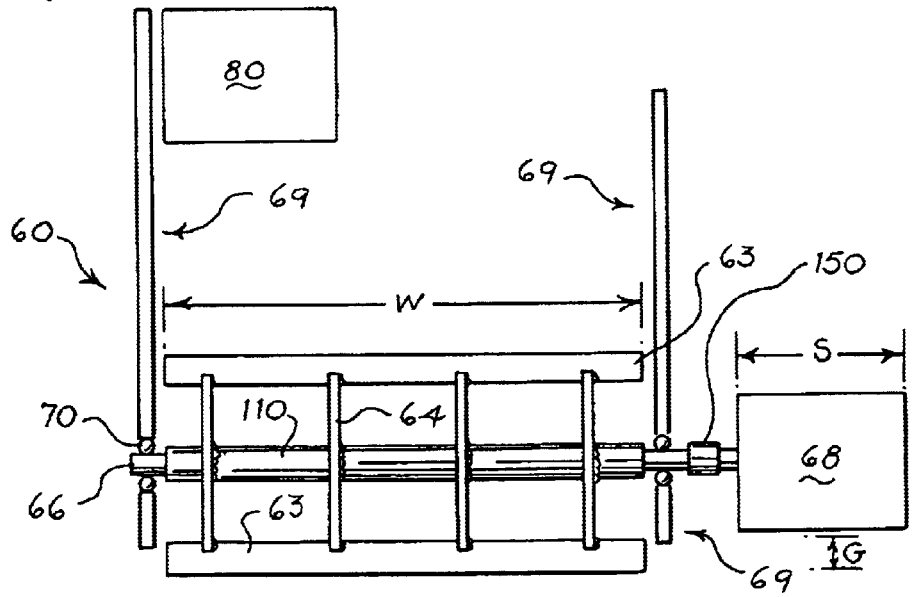
FIG. 2C is a stylized drawing showing a second embodiment of the motor placement in the prior art cutting unit.
Figure 2D:
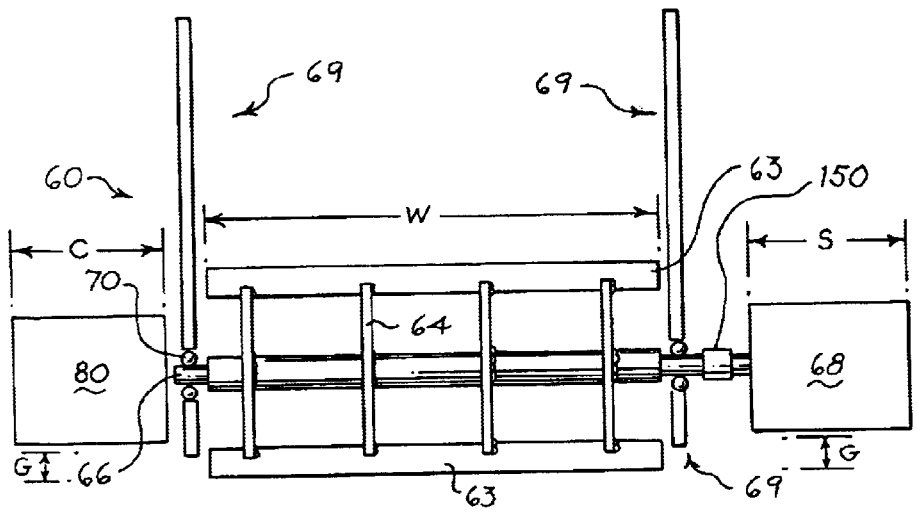
FIG. 2D is a stylized drawing showing a third embodiment of the motor placement in a prior art cutting unit.

Turning now to FIGS. 2B through 2D, when a prior art cutting unit motor 68 is attached to the housing 69 to power the cutting unit 60, it is either disposed above the housing 69 as seen in FIG. 2B, or in line with the cutting unit 60, as seen in FIGS. 2C and 2D. In either case, the weight of the cutting unit motor 68 should be counter-balanced to ensure that the weight applied to the grass is symmetrically balanced between the two points of support for the cutting unit 60. In some prior art cutting units 60, the weight of the side mounted motor 68 is balanced by a counter-balance 80 (FIGS. 2B–2D). In other prior art cutting units, however, the motor is counter-balanced by a second motor (not shown) in the same position as counter-balance 80. The second motor is used to drive optional accessories to the cutting unit 60 or to provide back-up power to the cutting unit 60. Both the counter-balance 80 and the secondary motor add unwanted weight to the cutting unit 60.

In the disclosed embodiments, the width $W_2$ is typically 18 to 30 inches. If the weight of the cutting unit motor 68 is not counter-balanced across the cutting unit width $W_2$, the actual cutting height and the quality of the cut will be adversely affected. This is especially noticeable for a cutting unit powered by an electric motor as the cutting unit motor 68 is heavy. In addition, the counter-balance 80 makes the overall weight of the cutting unit 60 greater, which again adversely affects the cutting quality. A heavy cutting unit 60 can compact the turf and leave unwanted marks. Further, the additional weight of a counter-balance 80 to each cutting unit 60, 61, and 62 adds unwanted weight to the entire mower 10 reducing the time the mower 10 can be operated before the mower battery 30 must be recharged.

In a typical prior art cutting unit as seen in FIGS. 2A–2D, the cutting unit 60 consists of multiple blades 63 attached to a central shaft 66 through a series of stamped steel spyders 64. This shaft 66 is generally mounted in bearings 70 at each end of the cutting unit 60 and is powered by the cutting unit motor 68, either through power coupling mechanism 90 or coupler 150. In FIG. 2B, the cutting unit motor 68 and the counter-balance 80 are mounted above the central shaft 66 and the blades 63 on housing members 69. A power coupling mechanism 90 transfers power from the motor 68 to the blades 63 of the cutting unit 60. The power coupling mechanism 90 can be a belt and pulley system, a gear train, a chain or other type of power transfer mechanism.

FIGS. 2C and 2D show the motor 68 mounted in a direct drive relationship. In this embodiment, the power transfer mechanism 90 shown in FIG. 2B is replaced by a coupler 150 and the side mounted motor extends the overall width of the cutting unit 60 thus limiting side clearance, and limiting the clearance G between the motor 68 and the ground.

In fact, the side motor placement in both FIGS. 2C and 2D affects both the ground clearance and side clearance of the entire mower 10. Since the side mounted motor 68 usually extends from the side of the cutting unit 60 by length S of approximately 6 to 8 inches, if the motor 68 is mounted on the inside of one of the front cutting units 60 or 61 (FIG. 1), the clearance between the two front cutting units 60 or 61, therefore, must be at least the length S of the side mounted motor 68, thereby limiting closer placement of the cutting units. Similarly, if the side mounted motor 68 is on the outside of one of the forward cutting units 60 or 61 (FIG. 1), it extends an extra 6 to 8 inches from the side of the cutting unit and thus the entire mower 10, preventing the mower 10 from making a close cut near bushes, fences, or other obstructions.

The prior art arrangement shown in FIG. 2D includes all of the drawbacks of that shown in FIG. 2C and in addition the side mounted counter-balance weight 90 increases the overall width of the mower 10 even further. The side mounted counter-balance has a length C that it extends past the end of the cutting unit 60.

Referring again to FIG. 1, if both front cutting units 60 and 61 have side mounted motors 68 and side mounted counter balances 80, the width from one end of cutting unit 60 to the other end of cutting unit 61 is at least 2W+2S+2C, and no grass is being cut within the space 2S+2C. In effect, each cutting unit has an area on either side of it that cannot be cut of S+C inches. Of course, a third cutting unit 62 mounted in the center rear of the mower 10 can cut the grass between the two front cutting units 60 and 61, but the space to either external side of the cutting units 60 and 61 cannot be reached. If the mower operator is cutting grass close to the edge of a wall or a fence or other obstruction, the mower 10 cannot cut any closer than S or C inches from the obstruction.

Figure 3:
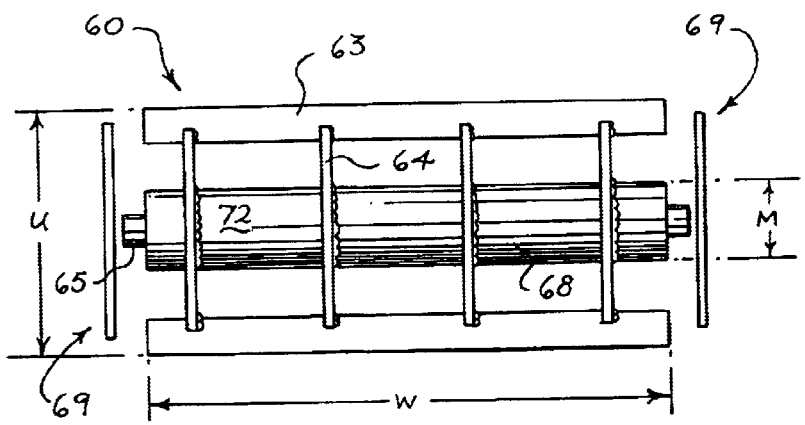
FIG. 3 is a stylized drawing of the motor placement in a cutting unit according to the present invention.

By contrast the current invention solves the problems of the prior art and is shown in stylized FIG. 3. The cutting units 60 of the present invention are of standard sizes so that they may be installed on traditional mowers in place of prior art cutting units. In the present invention, the cutting unit motor 68 is located within the blades 63 of the cutting unit 60. The motor 68 is preferably a DC motor, but other motors, both electrical and otherwise, can also be used. In the presently described embodiment, the electric motor 68 and a gear reduction (not shown) are enclosed within a tube 72 having a diameter M as small as two inches, thus fitting within the diameter of the space created inside the blades.

As is apparent from FIG. 3, the novel internal motor arrangement eliminates the problems of the prior art caused by extended cutting units due to their motor mounting systems. The internal motor arrangement also solves the problems of the prior art caused by the added weight necessary to balance the weight of the motor, but causing undesirable compaction of the grass. The cutting unit 60 shown in FIG. 3 can be placed in close alignment with other cutting units of like construction on a mower 10 using the same cutting unit positioning as that shown in FIG. 1. Additionally, the power coupling mechanism 90 such as a belt and pulley system, a gear train, a chain or other type of power transfer mechanism is not necessary in this novel internal drive system.

FIGS. 4A and 4B are cross-sectional views of two embodiments of the novel cutting unit motor arrangement. FIG. 4A shows the internal motor as part of the rotating housing 72. In FIG. 4A, the rotating windings 106 are attached to the inside of the rotating housing 72. The spyders 64 are attached to the exterior of the rotating housing 72 and blades 63 are supported by the spyders 64. The internal motor 68 is mounted on a stationary shaft 71, and stationary motor windings 104 surround the shaft 71. For an electrically powered motor, power is delivered to the internal motor 68 from a battery or generator (not shown) via power line 108. Power from the power line 108 is routed to the rotating winding 106 via slip rings 151, 152 and brushes 153, 154. The stationary shaft 71 is fixed to the housing 69 by fastening nut 102. The rotating housing 72 is mounted on bearings 70 so that it revolves easily around the stationary shaft 71. The internal motor 68 is protected from elements such as dirt and water by seals 100 located between the stationary shaft 71 and the rotating housing 72. The motor diameter D in this novel arrangement may need to be smaller than conventional cutting unit motors, but the windings 104 and 106 in this arrangement can be made longer than in the prior art to compensate for the smaller diameter. The windings disclosed in the present invention may take advantage of the full width of the cutting unit W, typically 18 to 30 inches. Rotation of the cutting unit 60 and thus the internal motor 68 serves to cool the internal motor and to minimize overheating, thus eliminating the need for fans or blowers.

FIG. 4B shows another embodiment of the internal motor 68 positioned inside the rotating housing 72 and cutting unit weldment 110. The stationary shaft 71 extends axially through the housing and is journaled at each end by bearings 70. The cutting unit weldment 110 is fastened to the rotating housing 72 with a series of fastening screws 112 or other suitable fastening means such as pins or any device used for joining two separate parts. The stationary shaft 71 is held non-rotatably within the cutting unit 60. In this embodiment, the spyders 64, instead of being welded directly to the rotating housing 72 can be welded to the outer cylinder 110, and everything inside the rotating housing 72 remains as described in FIG. 4A. Consequently, the motor 68 and the gear reducer assembly (not shown) are held stationary. The rotating housing 72 is mounted on bearings 70 to easily rotate along with the cutting unit weldment 110 when power is applied. The embodiment disclosed in FIG. 4B has all of the advantages described with respect to the embodiment in FIG. 4A and includes the additional advantage that after removing the screws 112 connecting the cutting unit weldment 110 to the rotating housing 72, the cutting unit weldment 110 including the spyders 64 and blades 63 are easily slid off of the internal motor assembly 68 for servicing or replacement.

In the foregoing specification, the invention has been described with reference to specific embodiments thereof. It will, however, be evident that various modifications and changes may be made thereto without departing from the broader spirit and scope of the invention as set forth in the appended claims. For example, an electrical overload protection means such as a fuse or other type of protection means can be contained internally inside the shaft of the cutting unit to prevent the motor from burning out. Other alternatives relate to using different types of motors in the internal drive system. Still other alternatives can embody different types of blades. The specification and drawings are, accordingly, to be regarded in an illustrative rather than a restrictive sense.

I claim:

1. A gang mower comprising:

a frame;

a plurality of wheels attached to the frame;

a prime mover including an electric motor carried on the frame, the prime mover to provide power to the gang mower; and a plurality of cutting units attached to the frame, the cutting units comprising:
a weldment;
a rotatable housing removably connected to the weldment;
a support shaft extending through the rotatable housing;
a series of stationary windings disposed about and fixed to the support shaft;

a series of rotating windings disposed about the stationary windings and fixed to and extending a length of an inside surface of the rotatable housing; and a plurality of cutting blades supported about an outside surface of the weldment, wherein the weldment and blades are removable for servicing or replacement.

2. The gang mower of claim 1 further comprising a battery operatively connected to the prime mover, the battery to provide power to the prime mover.

3. The gang mower of claim 1 further comprising a battery operatively connected to the motor, the battery to provide power to the motor to drive the cutting unit.

4. The gang mower of claim 1 further comprising a drive axle operatively attached to the prime mover and operatively attached to at least one wheel, and wherein the drive axle provides driving torque from the drive axle to the at least one wheel.

5. The gang mower of claim 1 wherein at least one of the cutting units has a cutting position and a raised non-operating position.

6. A cutting unit for a gang mower comprising:

a weldment having a plurality of blades attached thereto;

a rotatable housing removably connected to the weldment, wherein the weldment and blades are removable for servicing or replacement; and a motor located within the rotatable housing to power the cutting unit.

7. The cutting unit of claim 6 further comprising a plurality of spyders interconnecting said plurality of blades to said weldment.

8. The cutting unit of claim 6 further comprising at least one screw to fix the weldment and the housing for rotation.

9. The cutting unit of claim 6 further comprising:

a support shaft extending through the rotatable housing;

a series of stationary windings disposed about and fixed to the support shaft; and a series of rotating windings disposed about the stationary windings and fixed to and extending a length of an inside surface of the rotatable housing.

* * * * *